United States Patent [19]

Nishimura et al.

[11] 4,203,691
[45] May 20, 1980

[54] CONTACT DETECTING APPARATUS

[75] Inventors: Hideo Nishimura, Aichi; Shigeo Noda, Nagoya; Kunihiko Eto, Toyota, all of Japan

[73] Assignee: Toyoda Koki Kabushiki Kaisha, Kariya, Japan

[21] Appl. No.: 958,363

[22] Filed: Nov. 7, 1978

[30] Foreign Application Priority Data

Nov. 14, 1977 [JP] Japan ............................ 52-136554

[51] Int. Cl.$^2$ ..................... B23B 39/04; B23B 9/00; B23B 39/06
[52] U.S. Cl. ............................................. 408/8; 408/2; 408/13
[58] Field of Search ................................. 408/2, 8, 13

[56] References Cited

U.S. PATENT DOCUMENTS

| 2,932,191 | 4/1960 | Jahn | 408/2 |
| 3,492,894 | 2/1970 | Hahn et al. | 408/13 |
| 3,636,814 | 1/1972 | Esch | 408/8 |

Primary Examiner—Harrison L. Hinson
Attorney, Agent, or Firm—Oblon, Fisher, Spivak, McClelland & Maier

[57] ABSTRACT

A contact detecting apparatus for detecting the contact of a workpiece with a tool in a machine tool which comprises a coil mounted on the periphery of a spindle head and connected to an AC power source for generating an induced current in a looped secondary circuit including the workpiece, a work table, a machine body, a spindle head, a tool spindle and the tool, when the workpiece and the tool are moved relatively into contact with each other. Bypassing elements are included in the secondary circuit for bypassing an electric resistance in spindle bearings. A detector is connected between the AC power source and the coil for detecting a change in an electric signal caused by the contact between the workpiece and the tool.

3 Claims, 4 Drawing Figures

PRIOR ART 4,203,691

CONTACT DETECTING APPARATUS

BACKGROUND OF THE INVENTION

1. Field of the Invention

The present invention relates to a contact detecting apparatus for detecting the contact of a tool with a workpiece when they are moved relatively to one another.

2. Description of the Prior Art

As shown in FIG. 1, conventional contact detecting apparatus is provided with a coil 12 mounted on the end of a spindle head 11 in which a spindle 13 is rotatably received. This coil 12 is connected to an AC power source 14 to be energized, so that the coil 12 generates loops of magnetic flux surrounding the spindle 13 which induces current in a direction axially of the spindle 13. When a tool 1 does not contact a workpiece 2, a looped secondary circuit 15 connecting the spindle 13 and a machine body 10 is not completed, whereby there is no induced current. On the other hand, when the tool 1 contacts the workpiece 2, the looped secondary circuit 15 is completed to produce induced currrent. In this way, the secondary circuit 15 is completed depending upon the contact between the tool 1 and the workpiece 2, and an exciting current in the coil 12 on the primary side is changed depending upon the change in electric current in the secondary circuit 15. Accordingly, the contact between the tool 1 and the workpiece 2 can be detected by connecting the coil 12 and a resistance R1 in series and detecting the change in voltage appearing at terminals a and b across the resistance R1 by a voltage detector 16. FIG. 2 shows an equivalent circuit of the arrangement shown in FIG. 1. In FIG. 2, the secondary circuit 15 constitutes a winding of one turn; the tool 1 and the workpiece 2 constitutes a switch SW opened and closed by the contact.

In such an arrangement, when the spindle 13 was not rotated, the voltage change appeared on the terminals a and b depending upon the contact between the tool 1 and the workpiece 2, whereby the contact could be detected. However, when the spindle was rotated, substantially no voltage change appeared on the terminals a and b, so that the detection of the contact was difficult or virtually impossible.

It was found by inspection that an electric resistance R2 in the secondary circuit 15 was changed from several hundred mΩ to several hundred Ω depending upon rotation of the spindle, lubrication of spindle bearings, preload of the spindle bearings, and so on, and that this resistance R2 was changed mainly depending upon the electric resistance change of the bearings supporting the spindle 13, although also depending upon the contact resistance between the tool 1 and the workpiece 2 to some extent. When this resistance R2 was changed, the ratio of the voltage V1ON appearing on the terminals a and b when the switch SW is closed to the voltage V1OFF when the switch is opened, changed as shown in FIG. 3. In this case, the frequency f of the power source was 20 KHz, the inductance L of the coil 12 was 159 mH, the turn of the coil was 159 T, the winding resistance r1 was 0.35Ω and the detecting resistance R1 was 100Ω. According to the characteristics shown in FIG. 3, when the resistance R2 in the secondary circuit 15 is quite small, the voltage change ratio becomes greater than 2. However, when the resistance R2 is increased, the voltage change ratio is abruptly lowered to about 1, resulting in difficulty in detection. Taking change in power source voltage, drift of an amplifier and the like and induction noise into consideration, detection of the contact is considered to be difficult, unless the voltage change ratio is above 1.1. Accordingly, it is realized that the resistance R2 in the secondary circuit 15 has to be set below about 1Ω.

Roller bearings or ball bearings are usually used as spindle bearings. It is presumed that when the spindle is not rotated, rolling members such as rollers or balls make metallic contact with rolling surfaces of inner and outer races of the bearings, so that the electric resistance is small. It is also presumed that when the spindle is rotated, an oil film is formed between the rolling members and the rolling surfaces to prevent metallic contact, so that the electric resistance becomes large.

SUMMARY OF THE INVENTION

It is therefore an object of the present invention to provide a new and improved contact detecting apparatus with high sensitivity and stability.

Another object of the present invention is to provide a new and improved contact detecting apparatus comprising means for bypassing an electric resistance of the spindle bearings to stably decrease the resistance in the secondary circuit, irrespective of rotation of the spindle.

Briefly, according to the present invention, these and other objects are achieved by providing a contact detecting apparatus in a machine tool including a machine body, a work table mounted on the machine body for mounting thereon a workpiece to be machined, a spindle head mounted on the machine body, a tool spindle rotatably supported through bearings in the spindle head for supporting a tool, and control means for effecting relative movement between the work table and the tool spindle, as mentioned below. A coil is mounted on the periphery of the spindle head and connected to an AC power source for generating an induced current in a looped secondary circuit including the workpiece, work table, machine body, spindle head, tool spindle and tool, when the workpiece and the tool are moved relatively into contact with each other. Means is included in the secondary circuit for bypassing an electric resistance in the bearings. Means is connected between the AC power source and the coil for detecting change in an electric signal caused by the contact between the workpiece and the tool.

BRIEF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which.

DETAILED DESCRIPTION OF THE PREFERRED EMBODIMENT

Figure 1:
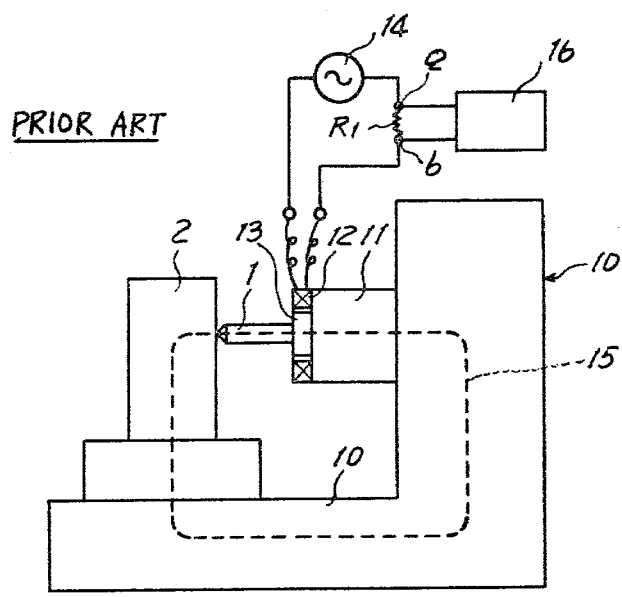
FIG. 1 shows an arrangement of a conventional contact detecting apparatus.
Figure 2:
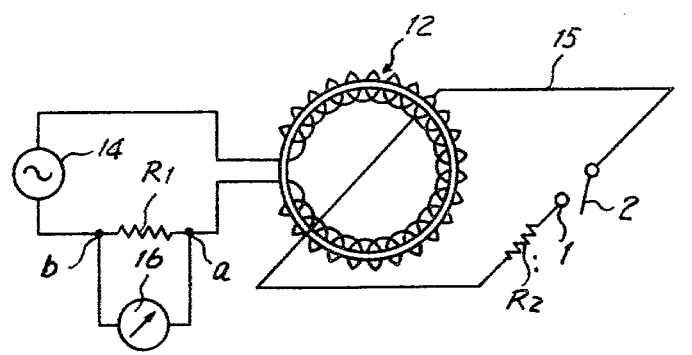
FIG. 2 shows an equivalent circuit of the conventional contact detecting apparatus shown in FIG. 1.
Figure 3:
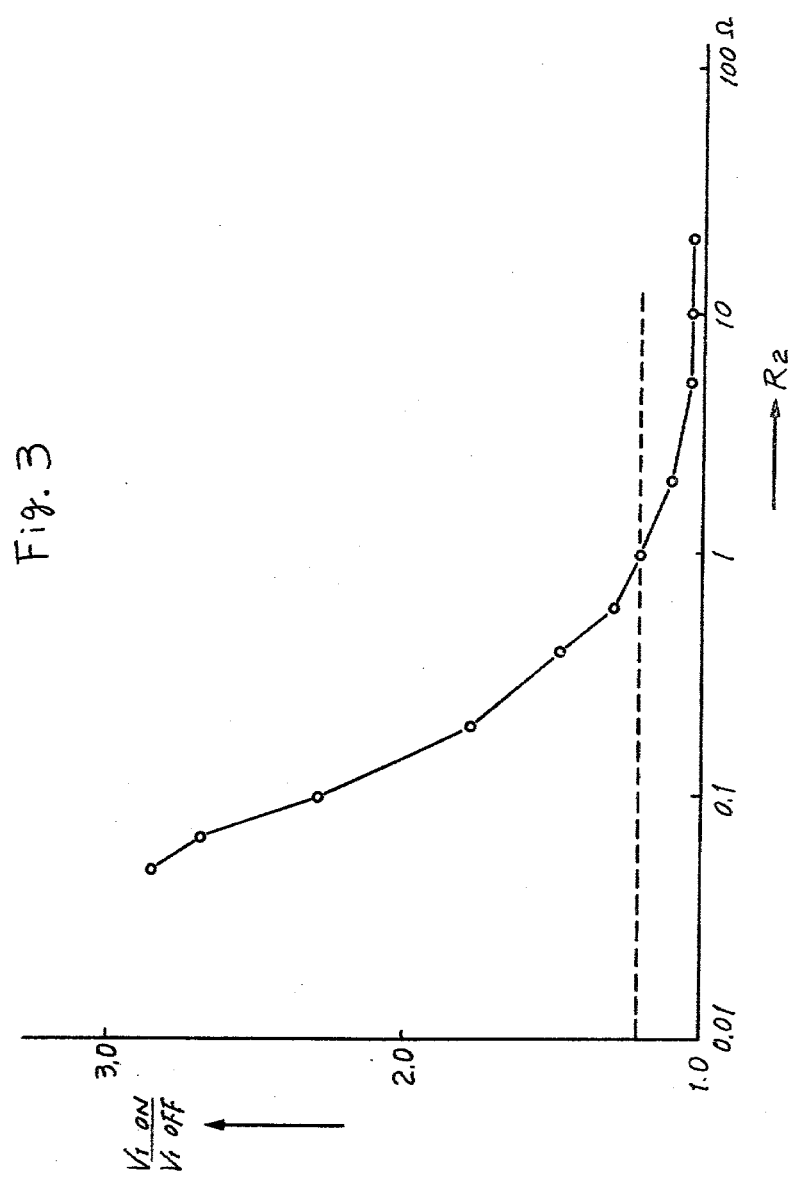
FIG. 3 is a graph showing the relationship between the secondary circuit resistance and the output voltage change ratio.
Figure 4:
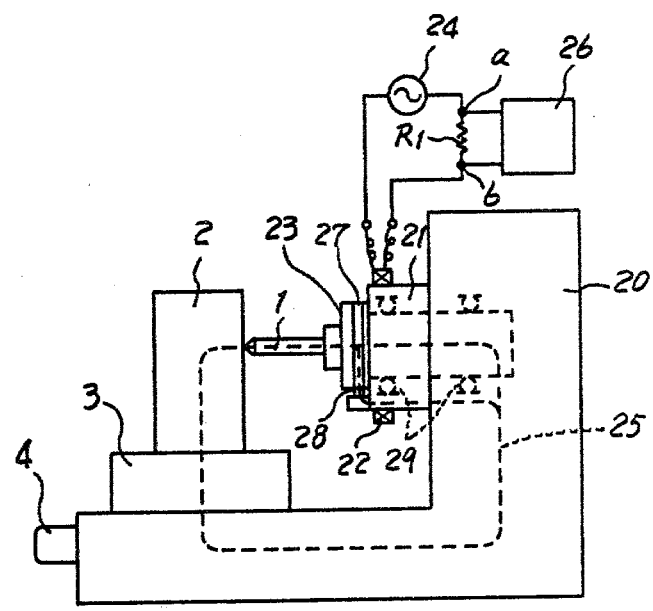
FIG. 4 shows an arrangement of a contact detecting apparatus according to the present invention.

Referring now to FIG. 4, a workpiece 2 to be machined is mounted on a work table 3, which is, in turn, slidably mounted on a machine body 20. The work table 3 is moved by a drive motor 4 secured to the machine body 20 in a well known manner. A spindle head 21 is secured to the machine body 20 to rotatably support a spindle 23 through bearings 29. The spindle 23 supports a tool 1 for a machining operation on the workpiece 2. A slip ring 27 which electrically conductive with the spindle 23 is provided on the periphery of the spindle 23. A brush 28 being in contact with the slip ring 27 is provided on the spindle head 21 to be conductive therewith. The slip ring 27 and the brush 28 constitute means for bypassing an electric resistance of the bearings 29 to decrease and stablilize a resistance R2 in a secondary circuit 25 irrespective of rotation of the spindle 23. The secondary circuit 25 is completed through the work table 3, the machine body 20, the spindle head 21, the slip ring 28, the brush 27 and the spindle 23 by the contact between the tool 1 and the workpiece 2.

A toroidal coil 22 is mounted on the front end of the spindle head 21 and is connected to an AC power source 24 through a detection resistance R1. This coil 22 is wound around an iron core which surrounds the spindle 23. When this coil 22 is excited by the AC power source, a current is induced in the looped secondary circuit 25 that is completed by the contact between the tool 1 and the workpiece 2. When the contact resistance between the tool 1 and the workpiece 2 is small, the induced current in the secondary circuit 25 is large. On the other hand, when the contact resistance is large, the induced current is small. When the tool 1 and the workpiece 2 are moved apart, no induced current is produced. This change in the secondary circuit 25 causes a change in exciting current of the coil 22 on the primary side, whereby a voltage change is caused at the terminals a and b across the resistance R1 connected in series to the coil 22. When the secondary circuit 25 is not completed, the magnitude of the exciting current of the coil 22 is small, whereby the output voltage at the terminals a and b is small. On the other hand, when the secondary circuit 25 is completed, the magnitude of the exciting current of the coil 22 is increased, whereby the output voltage at the terminals a and b is increased. A voltage comparator 26 connected to the terminals a and b detects the fact that the output voltage exceeds a set level when the tool 1 and the workpiece 2 are in contact with each other.

According to the present invention, provision of the means for bypassing the bearing resistance permits the resistance R2 in the secondary circuit 25 to be small. When the voltage change at the output terminals a and b is large and the contact resistance is constant, the same level of the output voltage is produced. Accordingly, the voltage comparator 26 can set the level free from the malfunction caused by noise and the like, thereby stabilizing detection of the contact and increasing reliability. Furthermore, the sensitivity of the detection of the contact state is increased, so that a slight contact between the tool tip and the workpiece can be positively detected.

In the above-described embodiment, the electric signal detecting means detects the voltage change on the primary side. Not only the detection of the voltage change, but also the detection of the electric current change, phase change and magnetic flux change are possible with the present invention. Detection of the voltage change or the electric current change on the secondary side is also possible with the present invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a machine tool including a machine body, a work table mounted on said machine body for mounting thereon a workpiece to be machined, a spindle head mounted on said machine body, a tool spindle rotatably supported through bearings in said spindle head for supporting a tool, and control means for effecting relative movement between said work table and said tool spindle, a contact detecting apparatus comprising:
   an AC power source;
   a coil mounted on the periphery of said spindle head and connected to said AC power source for generating an induced current in a looped secondary circuit including the workpiece, work table, machine body, spindle head, tool spindle and tool, when said workpiece and said tool are moved relatively into contact with each other;
   means included in said secondary circuit for bypassing an electric resistance in said bearings; and
   means connected between said AC power source and said coil for detecting a change in an electric signal caused by the contact between said workpiece and said tool.

2. A contact detecting apparatus as set forth in claim 1, wherein said bypassing means includes:
   a slip ring provided on the periphery of said tool spindle; and
   a brush provided on said spindle head to be in contact with said slip ring.

3. A contact detecting apparatus as set forth in claim 1 and 2, wherein said detecting means includes:
   a voltage detector connected between said AC power source and said coil.

* * * * *